US011958311B2

(12) United States Patent
Keagy (10) Patent No.: US 11,958,311 B2
(45) Date of Patent: Apr. 16, 2024

(54) ADDITIVE MANUFACTURING FOR PERSONALIZATION OR SERIALIZATION OF A SUBSTRATE (71) Applicant: HID Global CID SAS, Suresnes (FR)

(72) Inventor: John Aldridge Keagy, Round Rock, TX (US)

(73) Assignee: HID Global CID SAS, Suresnes (FR)

( * ) Notice: Subject to any disclaimer, the term of this patent is extended or adjusted under 35 U.S.C. 154(b) by 36 days.

(21) Appl. No.: 17/807,262

(22) Filed: Jun. 16, 2022

(65) Prior Publication Data
US 2023/0406027 A1 Dec. 21, 2023

(51) Int. Cl.
B42D 25/45 (2014.01)
B29C 64/112 (2017.01)
B29C 64/245 (2017.01)
B33Y 10/00 (2015.01)
B33Y 80/00 (2015.01)
B29L 17/00 (2006.01)

(52) U.S. Cl.
CPC ............ B42D 25/45 (2014.10); B29C 64/112 (2017.08); B29C 64/245 (2017.08); B33Y 10/00 (2014.12); B33Y 80/00 (2014.12); B29L 2017/00 (2013.01)

(58) Field of Classification Search
CPC ................................ B24D 25/45; B33Y 10/00
USPC .......................................................... 235/488
See application file for complete search history.

(56) References Cited

U.S. PATENT DOCUMENTS

| | | | | |
|---|---|---|---|---|
| 6,644,552 B1 * | 11/2003 | Herslow | ................ | B32B 27/06 235/488 |
| 8,322,623 B1 * | 12/2012 | Mullen | ............ | G06K 19/07722 235/488 |
| 2007/0163703 A1 * | 7/2007 | Romita | ..................... | B32B 7/12 156/227 |
| 2008/0245865 A1 * | 10/2008 | Mosteller | ............. | B42D 25/351 235/457 |
| 2009/0274879 A1 * | 11/2009 | Priya | ........................ | B32B 3/18 428/203 |
| 2020/0023666 A1 * | 1/2020 | Roche | ..................... | B32B 27/32 |
| 2021/0150294 A1 * | 5/2021 | Finn | ..................... | G06K 19/045 |
| 2021/0237499 A1 * | 8/2021 | Muth | ................... | B42D 25/405 |
| 2022/0080743 A1 * | 3/2022 | Knipp | ..................... | B41J 3/387 |
| 2022/0253661 A1 * | 8/2022 | Daley | .................... | B33Y 80/00 |
| 2023/0086189 A1 * | 3/2023 | Finn | ................ | G06K 19/07769 235/488 |
| 2023/0206021 A1 * | 6/2023 | Choo | ..................... | G06K 19/02 235/492 |

* cited by examiner

*Primary Examiner* — Allyson N Trail
(74) *Attorney, Agent, or Firm* — Schwegman Lundberg & Woessner, P.A.

(57) ABSTRACT

Techniques for using additive manufacturing for applying personalization or serialization information to a substrate are described herein. The techniques may include providing a base substrate formed from a first material such as polyvinyl chloride, polyester, or polycarbonate and applying, via an additive manufacturing process such as three-dimensional printing, a layer to at least a portion of the base substrate. The layer can include at least one of personalization or serialization information. The layer can be formed from the same material as the substrate or formed from a second material with substantially similar material properties as the substrate material.

20 Claims, 5 Drawing Sheets

ADDITIVE MANUFACTURING FOR PERSONALIZATION OR SERIALIZATION OF A SUBSTRATE

TECHNICAL FIELD

The present disclosure relates to additive manufacturing for personalization or serialization of substrates.

BACKGROUND

Substrate surfaces can be used to create documents such as identification cards (e.g., government-issued licenses, or workplace identification cards), credit cards, bank cards, retailer reward cards, or the like. These cards often require personalization (e.g., adding the name and/or picture of the individual to whom the card is to be issued), and/or serialization (e.g., adding a unique identification number to the card). The substrates can be made of materials such as a polyvinyl chloride (PVC), polyester (PET), polycarbonate (PC), or other similar polymers, and the serialization or personalization information can be added to the substrate via processes such as laser etching, or printing on the surface of the card with ink.

SUMMARY

Serialization and personalization information can be added to a substrate in a number of ways. For example, a laser can be used to mark or etch on the surface (or on a sub-surface) of the substrate to create black and white images, numbers, letters, etc. In another example, a laser can be used to cut, punch, or poke small holes through the substrate to create a see-through watermark like effect. Yet another process can involve depositing ink on the surface of the substrate and then covering the surface with a varnish or film to protect the ink. These methods can pose security and durability issues. For example, when encapsulating ink with a varnish or film, the encapsulation layer can be peeled back so that the personalization information can be altered if the card is stolen. Similarly, the encapsulation layer can wear off or wear down over time and allow for the ink to be exposed and begin to wear off such that the personalization or serialization information becomes unreadable.

Additive manufacturing, the process of creating an object by building it one layer at a time such as through three-dimensional (3D) printing, can be used to "add" a layer of substrate material such as a polyvinyl chloride (PVC), polyester (PET), or polycarbonate (PC), to a "blank" substrate or card. The added layer can include serialization or personalization information that can be added to the blank card via 3D printing to create the "final" or completed serialized and/or personalized document. In this context, the blank card may be a card with nothing on it, or can be a card with some printed information, such as a company name or logo, but does not yet contain any personalization or serialization information. For example, a "blank" employee badge may contain the name of the company or a company logo that can be universally included on all of the employee badges but contain no information specific to a particular employee. Similarly, a "blank" credit card may contain the name and/or logo of the issuing bank, the non-unique portion of the credit card number, etc., but not contain information such as a customer name, the unique portions of the credit card number, the security code, or the like.

An example method of personalization or serialization of a substrate can include providing a base substrate formed from a first material. The method can further include applying, via an additive manufacturing process such as 3D printing or material jetting, a layer to at least a portion of the base substrate, the layer including at least one of personalization information or serialization information. For example, the personalization or serialization information can be embedded in, contained within, etc., the additive manufactured layer. The layer can include a colored or pigmented ink, can be transparent, or be a combination thereof. The layer can be formed from the same material of the substrate (the first material) or can be formed from a second material with substantially similar material properties as the first material.

In an example, the base substrate may be a substrate that includes a cavity, depression, gap, hole, or the like formed in at least a portion of the base substrate. In such an example, the method can further include filling at least a portion of the cavity, via an additive manufacturing process, with one or more voxels (e.g., units of graphic information that defines a point in three dimensional space). In an example, the voxels can be colored, clear, or a combination thereof such as to form personalization information such as an image (e.g., a picture of an employee) on the portion of the base substrate in which the cavity is located. The voxels can completely fill the cavity or fill a portion of the cavity.

The method can further include applying, using the additive manufacturing process, an additional layer to at least a portion of the base substrate. In an example, the additional layer can be applied to at least a portion of the surface of the base substrate such as the portion of the base substrate in which the cavity is located. When the cavity is not completely filled with the voxels, the additional layer may act to fill in a remaining portion of the cavity. On the other hand, when the voxels completely fill the cavity, the additional layer may act as an encapsulation layer to "seal" a portion of the surface (e.g., the entire surface) of the base substrate and voxel layer combination. The additional layer may contain additional personalization and/or serialization information to be included on the base substrate separate from the location of the cavity. The additional layer can be the same material as the base substrate (the first material) or a second material with substantially similar material properties as the first material.

The use of additive manufacturing to apply layers to a base substrate of the same or a substantially similar material can provide increased durability when compared to a process in which ink alone is deposited on the surface of the substrate and covered with a varnish, as well as additional security of the personalization or serialization information. The additional layers cannot be peeled back (or wear off) to allow access to the ink, and thus the ink cannot be modified, altered, or changed, nor can the ink rub off, wear off, fade, diminish, or otherwise become unreadable.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Documents such as government issued identification cards (e.g., driver's licenses), workplace identification cards or identification badges, credit cards, or the like, are often printed on substrates such as a polyvinyl chloride (PVC), polyester (PET), polycarbonate (PC), acrylic-based polymers, urethane-based polymers, or any similar polymer or resin suitable for the creation of such cards. These cards generally include personalization information or serialization information. Personalization information can include, for example, the name of the person to whom the card is to be issued, a picture of the cardholder, the address of the cardholder (e.g., when the credential is a government issued identification such as a driver's license), a work location of the cardholder (e.g., when the credential is an employee identification badge, the work location can be a specific building, floor, office number, etc.), or other information personal to or about the person to whom the card is issued. The serialization information can be an alphanumeric string, bar code, QR code, or the like uniquely identifying the card and/or tied to the person to whom the card is issued, such as a credit card number. The cards can also include non-personalization or non-serialization information material or information, such as a logo or other similar marking common across a (often large) plurality of cards created. Generally, the non-personalization/non-serialization material or information is printed on the card first, and then personalization and/or serialization information are printed on the card when it is to be issued to a specific person.

Methods for serialization and personalization of substrate cards occur using techniques such as lasering of the sub-surface of the substrate to create black and white images and/or depositing ink on the surface of the substrate to create colored images and/or using a laser to cut, punch, or poke small holes through the substrate to create a see-through watermark effect. When ink is deposited on the surface of the substrate, a varnish, film, or laminate layer is often used to encapsulate the surface of the substrate to protect the ink or the laser cut images.

There are disadvantages to these methods, such as lack of durability and security. When a varnish, film, or laminate layer (a "top layer") is used to encapsulate the surface of the substrate, the top layer can be peeled back or peeled off, either purposely or inadvertently, wear down, or wear off providing access to the personalization or serialization information. This can cause the personalization or serialization information to degrade, fade, or diminish, or to be altered or changed. The techniques herein describe methods to add personalization or serialization information to a substrate via an additive manufacturing process that results in a more secure and durable final product by creating a "monoblock" (e.g., a single block) of material with each layer having a high bond strength that cannot be peeled apart or as easily altered as cards created via different methods.

Adding Personalization or Serialization Information in Layers to a Substrate by Additive Manufacturing:

Additive manufacturing is a process of creating an object by building it one layer at a time, such as through three-dimensional (3D) printing. In the example of a card formed from a substrate, additive manufacturing can be used to add one or more layers of substrate material that includes personalization and/or serialization information to the "base" substrate (e.g., embedded in, printed into, etc.). In an example, the base substrate can be blank, for example, a blank polyvinyl chloride, polyester, or polycarbonate card with nothing printed on it, or can be a substrate with some material printed on it, such as a bank or company logo, bank or company name, or other information or pictures that are common across a (often large) plurality of cards that are issued but does not have any personalization or serialization information specific to the person to whom the final card will be issued. In another example, the base substrate can include some (e.g., partial) personalization or serialization information provided on at least a portion of the surface such as through inkjet printing or lasering, and then additional or other personalization and/or serialization, can be provided using additive manufacturing. For example, on a credit card, the first digits that identify the issuing bank can be provided on the base substrate prior to the additive manufacturing processes and the additional numbers that are assigned to the individual cardholder can be provided using the additive manufacturing process described herein.

The base substrate can be a partial-thickness substrate, or stated another way, the base substrate can be thinner than the finished card that is issued to the card holder. For example, the thickness of the final issued card can be about 0.030 inches+/−0.003 inches and the partial-thickness substrate can have some thickness between about 0.024 inches and 0.030 inches. Essentially, a partial-thickness substrate can have a thickness that is less than the desired or expected thickness (or a standard thickness) of a final or completed card or credential, which includes one or more additive manufactured layers (described below). Then, the layer(s) with the personalization and/or serialization information can be added to the partial-thickness substrate to form the final layer(s) and create the full thickness final document, card, or credential.

Figure 1A:
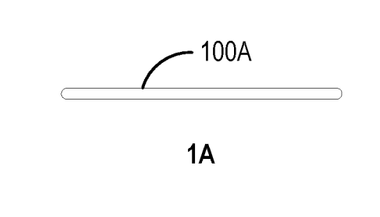
FIGS. 1A-1C illustrate an example of using additive manufacturing to add personalization and/or serialization to a substrate.
Figure 1B:
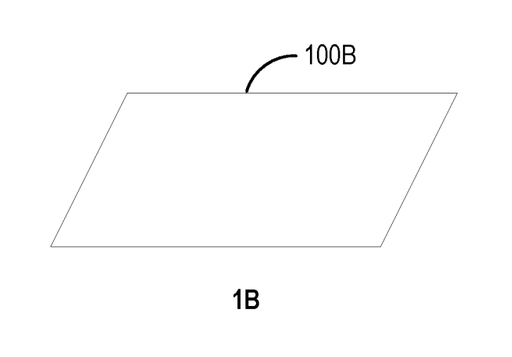
Figure 1C:
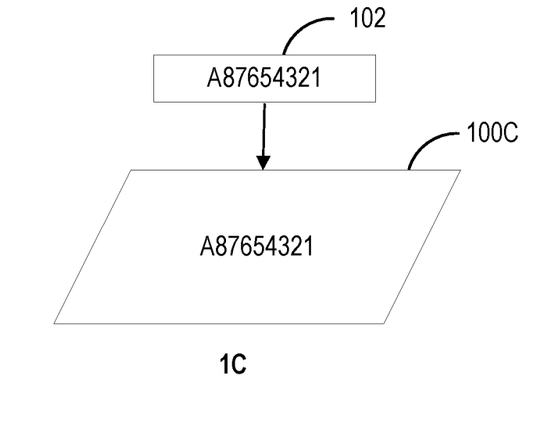

FIGS. 1A-1C illustrate an example of using additive manufacturing to add a personalization and/or serialization to a substrate. In an example, a credential, card, or the like, formed from a resin or a polymer material such as polyvinyl chloride, polyester, polycarbonate, a urethane-based polymer, an acrylic-based polymer, etc., can be provided. FIG. 1A illustrates a side view of a blank or unfinished credential 100A. FIG. 1B illustrates a view of the top surface of a blank or unfinished credential 100B, and FIG. 1C illustrates a view of the top surface of the finished (or partially finished) credential 100C with personalization and/or serialization information added to the credential via an additive manufacturing process. The blank credential 100A, 100B can be a full-thickness credential or substrate. A full thickness substrate can be a substrate having a thickness that is the same as or substantially the same as that desired or expected (or standard) for the final or fully completed card. Stated another way, the blank credential 100A, 100B can be substantially the same as the thickness of the final, finished credential 100C with the personalization and/or serialization information 102 added to it (e.g., approximately 0.030 inches+/−0.003 inches thick when viewed from the side as shown by 100A). When viewed from the top, as illustrated in 100B, the credential 100A, 100B can be a completely blank credential with nothing printed, stamped, etched, engraved, etc., on it, or can be a partially finished credential with some material or information printed on it, such as a logo, name, address, number, etc., that is common across a (often large) plurality of credentials issued.

While the blank credential 100A, 100B can have some information printed on it, in one example, the blank credential 100A, 100B may have no personalization or serialization information included or printed on its surface. In another example, the blank credential 100A, 100B can have some (e.g., partial, or incomplete) personalization or serialization information already included on it, for example a partial number (e.g., the portion of a credit card number that identifies the issuing bank). The partial personalization and/or serialization information can be printed on the blank credential 100A, 100B via methods such as lasering or inkjet printing, but not include all of the personalization or serialization information that is to be included on the finished credential 100C.

In an additive manufacturing step, such as a 3D printing step, personalization and/or serialization information 102 can be applied to the blank credential 100A, 100B, by applying a layer of the substrate material (or a material with properties substantially similar to or the same as the blank credential 100A, 100B) to at least a portion of the top surface of the blank credential 100B (e.g., the portion of the top surface of the blank credential 100B where the personalization and/or serialization information 102 will be displayed), resulting in the final credential 100C. The additive layer including the personalization and/or serialization information 102 can be transparent or can be in color. Color can be added to the additive layer through a process of material jetting (e.g., Polyjet®) or a similar process that combines inkjet technology and the use of photopolymers that harden when exposed to ultraviolet rays so that the personalization and/or serialization information 102 can be printed in color yet be a part of the hardened layer added to the top surface of the blank credential 100B. The added layer can be much thinner than the blank credential 100A, 100B (e.g., 0.00063 inches compared to 0.030 inches), so as to not substantially increase the overall thickness of the final credential 100C.

Figure 2:
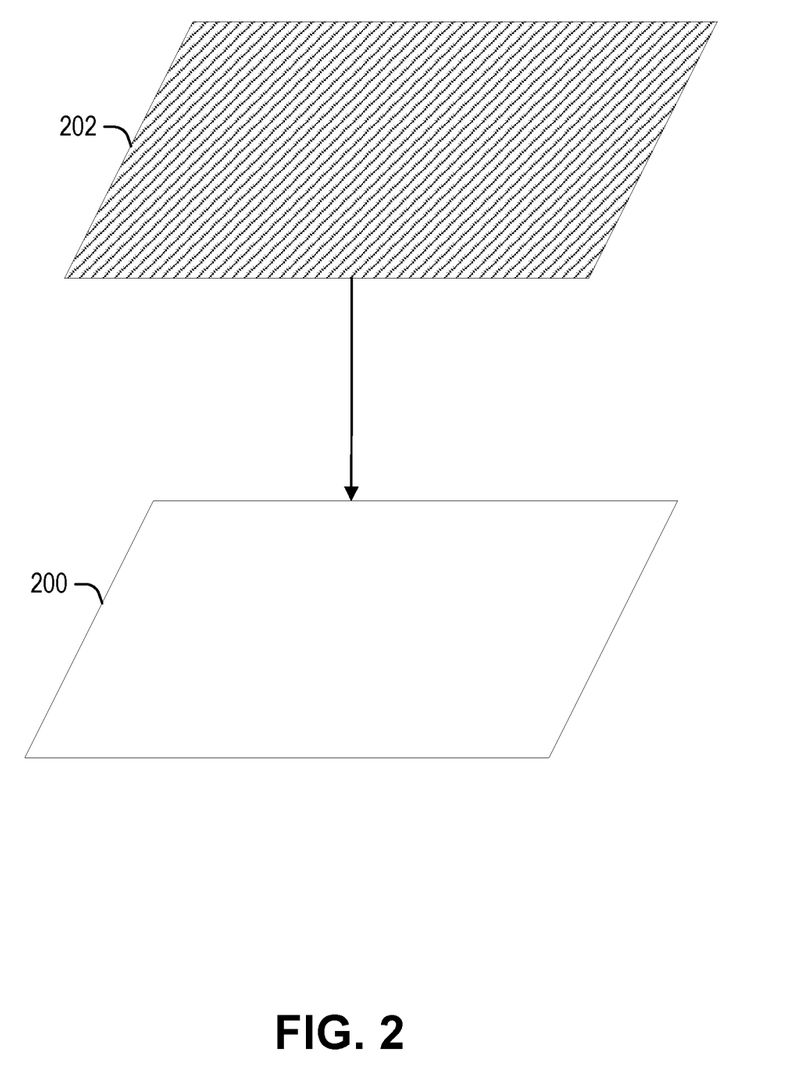
FIG. 2 illustrates an example of using additive manufacturing to add a printed layer to a partial-thickness substrate.

FIG. 2 illustrates an example of using additive manufacturing to add one or more printed layer(s) to a partial-thickness substrate, such as the kind of partial-thickness substrate described above. In the example illustrated in FIG. 2, a blank, partial-thickness substrate 200 can be provided. As was the case with the blank credentials 100A, 100B described in FIGS. 1A and 1B, the blank partial-thickness substrate 200 can be completely blank or can have non-personalization or non-serialization information included on it or applied to it, or printed on it, but contain no personalization or serialization information. Alternatively, the blank partial-thickness substrate 200 can contain some, but not all, personalization or serialization information, incomplete personalization or serialization information, etc., on at least a portion of its surface. The blank partial-thickness substrate 200 can be thinner, for example, than the thickness of the final credential 100C of FIG. 1C. For example, the blank partial-thickness substrate 200 can have a thickness of less than 0.030 inches. In an additive manufacturing step, and one or more additive manufactured layers 202, can be applied to at least a portion of the blank partial-thickness substrate 200 (e.g., through 3D printing) and can be the same material or have substantially similar or substantially the same material properties as the blank partial-thickness substrate 200.

As discussed above, an additive manufactured layer 202 can be a transparent layer, or can include color images, numbers, or other details formed in the additive manufactured layer 202 through a process such as material jetting. In an example, an additive manufactured layer 202 can be the same size (e.g., have the same surface area) as the blank partial-thickness substrate 200. In another example, an additive manufactured layer 202 can be applied to only a portion of the blank partial-thickness substrate 200. An additive manufactured layer 202 can have a thickness which is less than the blank partial-thickness substrate 200 (e.g., 0.0039 inches, 0.0079 inches, or any desired thickness) such that when the additive manufactured layer(s) 202 is/are applied to the blank partial-thickness substrate 200, the result is a full thickness credential such as final credential 100C. The process of creating a final credential can include applying multiple additive manufactured layers above or on top of the blank partial-thickness substrate 200 as desired. In an example, each of the additive manufactured layers such as additive manufactured layer 202 can contain personalization and/or serialization information, on a portion thereof. In an example, any or all of the additive manufactured layers can contain personalization and/or serialization information. However, one or more of the additive manufactured layers can contain no personalization or serialization information, or can contain non-personalization or non-serialization information, as desired. In an example, the one or more layers can collectively provide the personalization and/or serialization information. That is, a portion of the personalization and/or serialization information can be provided in a first of the layers while another portion of the personalization and/or serialization information can be provided in another of the layers, such that the personalization and/or serialization is collectively provided by multiple layers. Additionally, or alternatively, another blank or substantially transparent or semi-transparent additive manufactured layer can be provided to encapsulate the surface of the final document. In an example, one of the additive manufactured layers can include personalization information, another additive manufactured layer can contain serialization information, and yet another additive manufactured layer can be blank or transparent to encapsulate the surface of the final document, final card, etc., or to bring the final card to a desired final thickness (e.g., 0.030 inches+/−0.003 inches).

Adding Personalization or Serialization Information to a Base substrate by Filling a Cavity:

The base substrates described above can have one or more cavities, depressions, dips, craters, etc. (e.g., a partial-thickness cavity), formed in the surface of the base substrate into which the personalization or serialization information can be added or deposited, such as, for example with 3D printed voxels that at least partially "fill in" the cavity. For example, an approximately 0.030 inch base substrate can have one or more cavities formed (e.g., cut) into its surface. The cavity can be of any depth, for example, 8 thousandths, 4 thousandths, 2 thousandths, or any depth desired or appropriate for the information which is to be added in the additional layer or layers.

Figure 3:
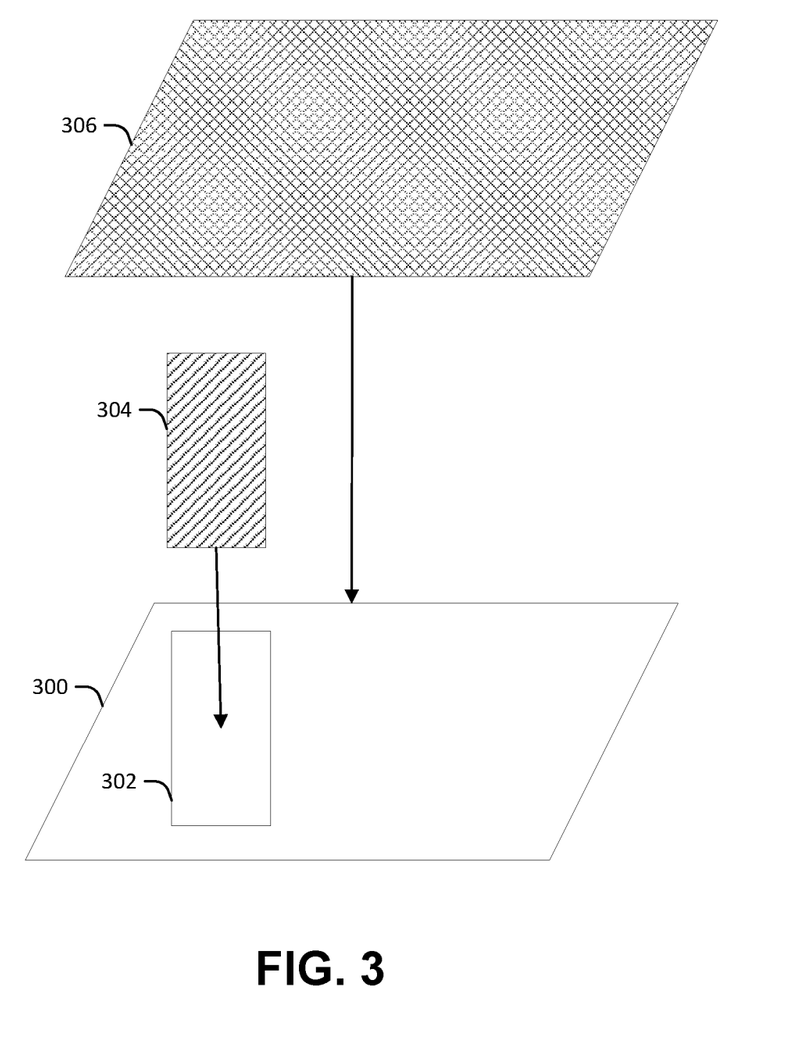
FIG. 3 illustrates an example of using additive manufacturing to a credential with a cavity formed in a portion of a substrate.

FIG. 3 illustrates an example of using additive manufacturing to a credential with a cavity formed in a portion of a substrate. As illustrated in FIG. 3, a base substrate 300 can include a cavity 302. The cavity 302 can be a cavity, depression, cut-out, crater, dip, or the like, formed in a portion of the base substrate 300. As discussed above, the base substrate 300 can include some material or information printed on it but contain some or no serialization or personalization information. The portions of the base substrate 300 without the cavity 302 can be the "full" or entire thickness desired for the final credential to be produced (e.g., 0.030 inches+/−0.003 inches), or can be a partial-thickness substrate such as described above with respect to FIG. 2.

Returning to FIG. 3, in an additive manufacturing process, one or more voxel layers 304, can be applied to the portion of the base substrate 300 containing the cavity 302. A voxel layer 304 may contain one or more voxels (e.g., units of graphic information that defines a point in three-dimensional space) formed from the same or a similar material or a suitable different material as the base substrate 300. A voxel layer 304 may apply or print personalization information such as an image (e.g., a picture of the person to whom the credential will be issued), or portion thereof, in the cavity 302 and thus, "fill in" at least a portion of the cavity 302. The depth of the cavity 302 can be determined by what information, images, or the like are to be added in a voxel layer 304. A voxel layer 304 can either completely or partially fill in the cavity 302, depending on, for example, whether additional additive manufactured layers are to be added above the voxel layer 304. As also illustrated in FIG. 3, an additional layer 306, can be applied to the combination of the base substrate 300, the partial-thickness cavity 302, and the voxel layer(s) 304, such as after the application of the voxel layer(s) 304. The additional layer 306 can be another additive manufactured layer formed from a material that is the same as or substantially similar to the base substrate 300 and/or the voxel layer(s) 304 and can contain additional personalization or serialization information. Additionally, or alternatively, the additional layer 306 can be a layer of laminate, varnish, film, or any desired material suitable for providing an encapsulation layer to the finished document, credential, or card. In the example in which the additional layer 306 is a film, varnish, or laminate layer, the additional layer 306 need not contain any personalization or serialization information, all of which can be included in the layers forming the monoblock beneath the additional layer 306.

Figure 4:
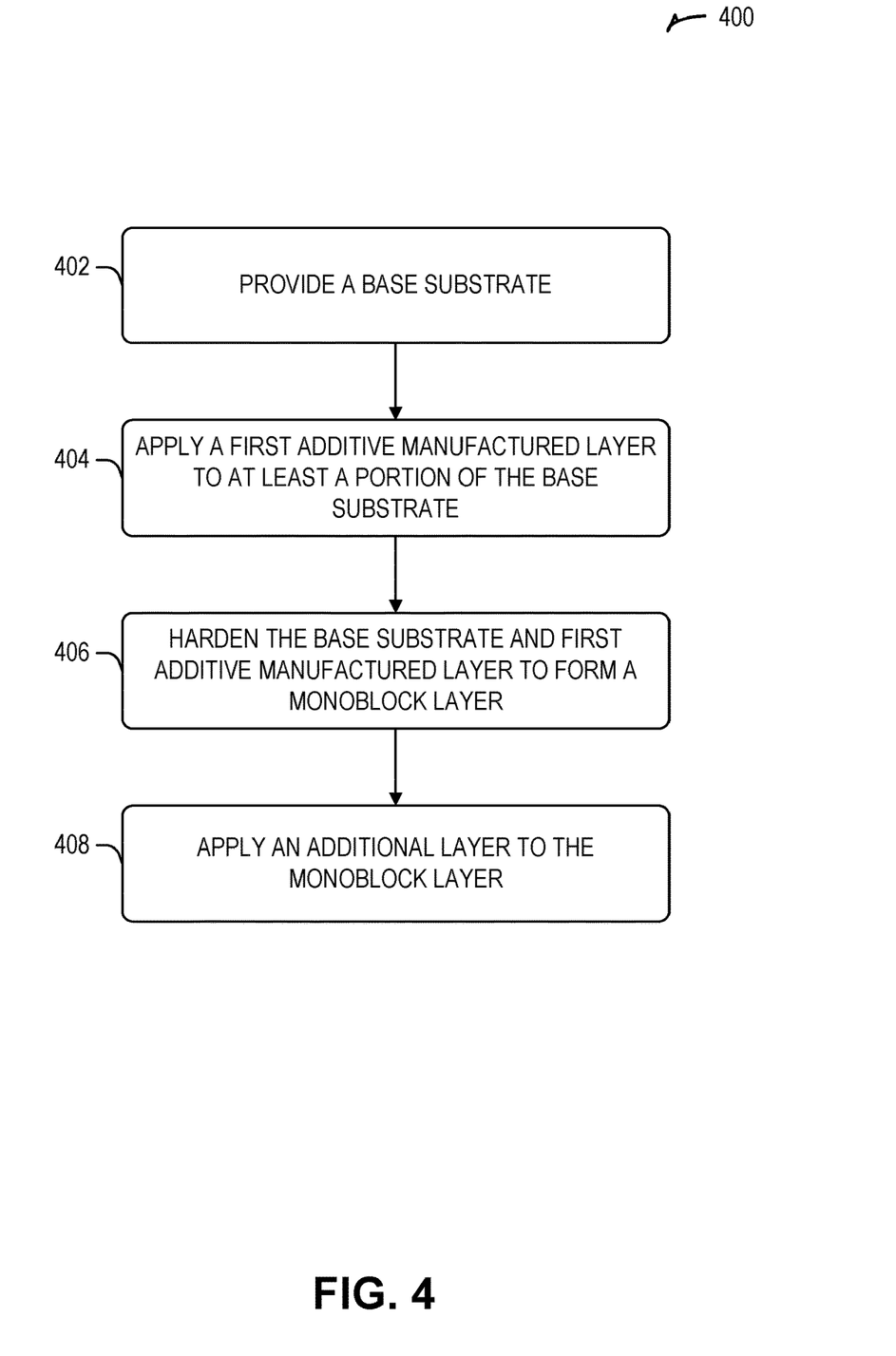
FIG. 4 illustrates an example method of personalization or serialization of a substrate.

FIG. 4 illustrates an example method 400 of personalization or serialization of a substrate. Operation 402 can include providing a base substrate. The base substrate can be formed from a first material, such as polyvinyl chloride, polyester, polycarbonate, a urethane-based polymer, an acrylic-based polymer, or any suitable polymer or polymer-like material. The base substrate can be a partial-thickness substrate, (e.g., thinner when compared to the thickness of a final credential or card formed from the substrate) or can be a full-thickness credential (e.g., substantially the same thickness as the final credential or card formed from the substrate), as described above.

Operation 404 can include applying one or more first additive manufactured layers to at least a portion of the base substrate. A first additive manufactured layer may include at least a portion of at least one of personalization information or serialization information embedded therein. Personalization information can include, for example, the name of the person to whom the card is to be issued, a picture of the cardholder, the address of the cardholder (e.g., when the credential is a government issued identification such as a driver's license), a work location of the cardholder (e.g., when the credential is an employee identification badge the work location can be a specific building, floor, office number, etc.,) or other information personal to or about the person to whom the card is issued. Serialization information can be an alphanumeric string, bar code, QR code, or the like uniquely identifying the card and/or tied to the person to whom the card is issued, such as a credit card number. The base substrate can be void of information or images on any surface thereof or can include non-serialization or non-personalization information on a separate portion of the surface than, and/or same portion of the surface, to which the first additive manufactured layer is applied. In an example, the base substrate can include information such as a logo or other design (or partial personalization or serialization information) onto which personalization or serialization information can be added. Stated differently, information included in the additive layers may overlap with information on the blank or base substrate. A first additive manufactured layer can be formed from the same or substantially similar material as the substrate or from a second material. The second material can be polyvinyl chloride, polyester, polycarbonate, a urethane-based polymer, an acrylic-based polymer, or any similar polymer or polymer-like substance.

Operation 406 can include hardening the base substrate and the first additive manufactured layer(s) to form a monoblock layer. The hardening process can be performed, for example, by drying or baking the combination of the base substrate and the first additive manufactured layer, using ultraviolet (UV) light to cure the combination of the base substrate and the first additive manufactured layer to form a single layer, single block, or the like. Operation 406 can include any process that can cause the additive manufactured layer to bond or combine with the base substrate.

Operation 408 can include applying one or more additional layers to the monoblock layer. An additional layer can also be an additive manufactured layer formed from the first material, the second material, or another material. An additional layer can include at least a portion of additional personalization and/or additional serialization information embedded therein.

In another example, an additional layer can be a film, a varnish, a laminate (e.g., a hot laminate), or any material suitable for encapsulating the monoblock layer. In such an example, an additional layer need not include or contain, and may be free of any, personalization or serialization information.

Figure 5:
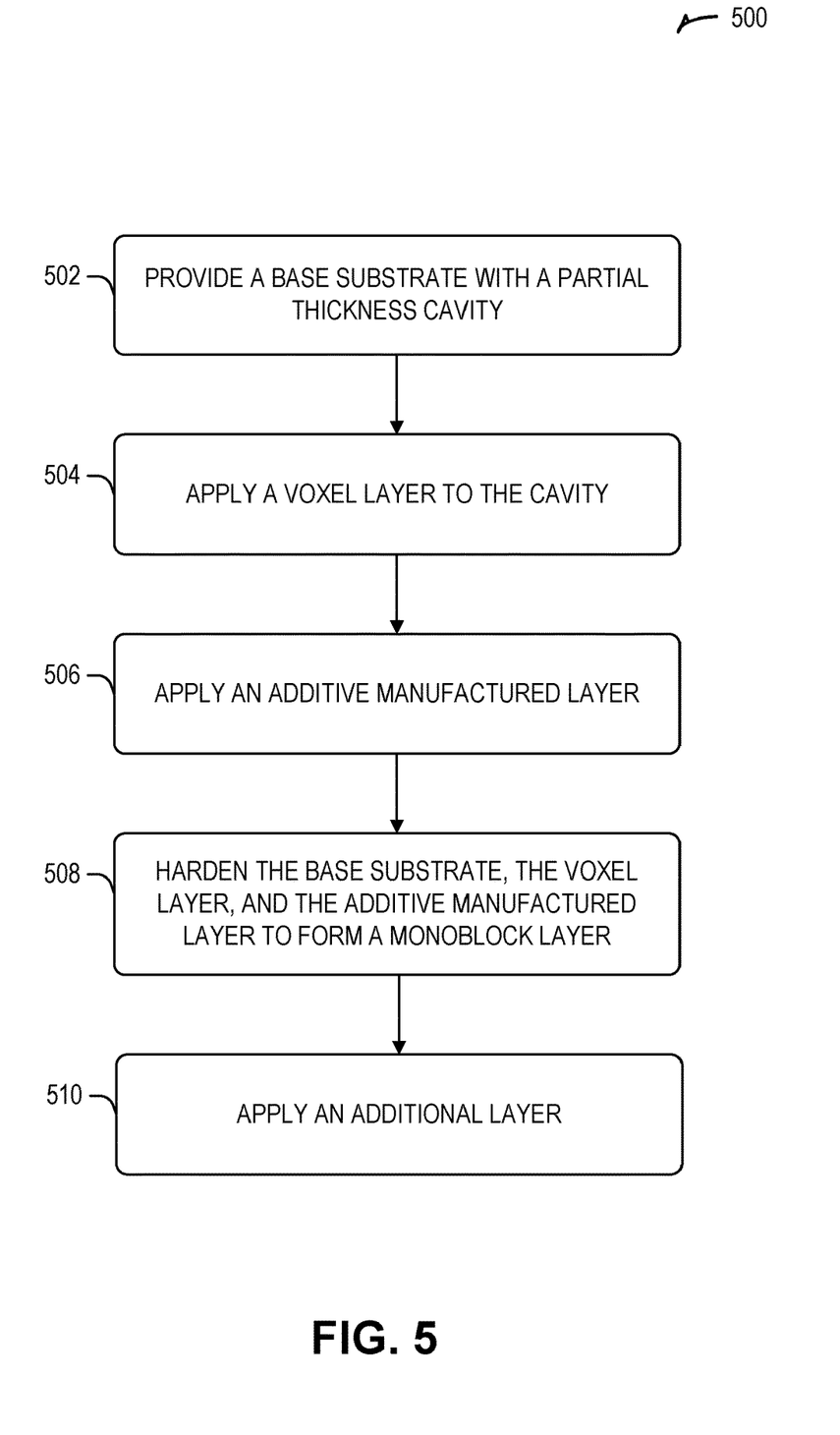
FIG. 5 illustrates an example method of personalization or serialization of a substrate.

FIG. 5 illustrates another example method 500 of personalization or serialization of a substrate. Operation 502 can include providing a base substrate with a cavity. The cavity can be a depression, cut-out, crater, dip, or the like, formed in a portion of the base substrate. As discussed above, the base substrate can be formed from a first material, such as polyvinyl chloride, polyester, polycarbonate, a urethane-based polymer, an acrylic-based polymer, or any suitable polymer or polymer-like material. The base substrate can be a partial-thickness substrate, (e.g., thinner when compared to the thickness of a final credential or card formed from the substrate) or can be a full-thickness credential (e.g., substantially the same thickness as the final credential or card formed from the substrate).

Operation 504 can include applying one or more voxel layers to the cavity. A voxel layer may contain one or more voxels (e.g., units of graphic information that defines a point in three-dimensional space) formed from the same or a similar material as the base substrate or a different material. A voxel layer can apply or print personalization information such as a personalization image (e.g., a picture of the person to whom the credential will be issued), or serialization information in the cavity and thus, "fill in" at least a portion of the cavity. The depth of the cavity can be determined by what information, images, or the like are to be added in the voxel layer. The voxel layer can either completely or partially fill in the cavity, depending on, for example, whether additional additive manufactured layers are to be added above the voxel layer.

Operation 506 can include applying an additive manufactured layer. The additive manufactured layer can be applied to at least a portion of the surface of the base substrate including the voxel layer. The additive manufactured layer can be a layer free of any printing or information, which can act to encapsulate the base substrate and the voxel layer. Alternatively, the additive manufactured layer can include personalization or serialization information to be added to other portions of the base substrate separate from the voxel layer. For example, the additive manufactured layer can include personalization information such as a name, address, physical characteristics, or the like that can be applied in proximity to an image applied in the voxel layer, such that the layout of the card includes an image of the cardholder applied in the voxel layer with the name, address, or physical characteristics applied in proximity to the image, such as would be found on a state issued driver's license. In another example, the additive manufactured layer can include non-personalization or non-serialization information such as a logo or other design that was not included on the blank or substrate.

Operation 508 can include hardening the base substrate, the voxel layer, and the additive manufactured layer to form a monoblock layer. The hardening process can be performed, for example, by drying, baking, or using ultraviolet (UV) light to cure the combination of the base substrate and the first additive manufactured layer to form a single layer, single block, or the like. Operation 508 can include any process that can cause the additive manufactured layer to bond or combine with the base substrate.

Operation 510 can include applying an additional layer to the monoblock layer. The additional layer can be a second additive manufactured layer formed from the first material, a second material. In this case, the additional layer can include additional personalization and/or additional serialization information embedded therein. In another example, the additional layer can be a film, a varnish, a laminate (e.g., a hot laminate), or any material suitable for encapsulating the monoblock layer.

Any additive manufacturing process discussed herein can include 3D printing, material jetting, or any similar process in which layers can be added to and bonded to the base substrate, which can include, for example, forming a monoblock as discussed above. The processes described herein can include adding or applying any number of additive manufactured layers, which may or may not all include personalization or serialization information within them, to the base substrate as desired to create a document, card, or credential of any thickness. A top layer formed from a material or a substance such as varnish, laminate, film, or any similar material can optionally be included but need not include any personalization or serialization information.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for applying personalization or serialization information to a substrate, the method comprising:
    providing a base substrate formed from a first material;
    applying, via at least one of three-dimensional (3D) printing or material jetting, a first additive manufactured layer to at least a portion of a surface the base substrate, the first additive manufactured layer including at least a portion of at least one of personalization information or serialization information embedded therein; and
    causing the base substrate and the first additive manufactured layer to harden.

2. The method of claim 1, wherein the first material is at least one of polyvinyl chloride (PVC), polyester (PET), or polycarbonate (PC).

3. The method of claim 1, wherein the base substrate comprises information on the surface that is non-serialization or non-personalization information.

4. The method of claim 1, wherein the first additive manufactured layer is formed from a second material.

5. The method of claim 4, wherein the second material is the same as the first material.

6. The method of claim 4, wherein the second material is polyvinyl chloride (PVC), polyester (PET), a polycarbonate (PC), a urethane-based polymer, or an acrylic-based polymer.

7. The method of claim 4, further comprising:
    applying an additional layer to at least a portion of the base substrate and first additive manufactured layer, wherein the additional layer is a second additive manufactured layer formed from the first material or the second material.

8. The method of claim 1, further comprising:
    applying an additional layer to at least a portion of the base substrate and first additive manufactured layer, wherein the additional layer is a film, a laminate, or a varnish and does not contain personalization information or serialization information.

9. The method of claim 1, wherein the base substrate comprises some personalization or some serialization information included on at least a portion of the surface.

10. The method of claim 1, wherein the base substrate and the first additive manufactured layer harden to form a monoblock layer, and further comprising:
applying an additional layer to at least a portion of the monoblock layer.

11. A method for applying personalization or serialization information to a substrate, the method comprising:
providing a base substrate formed from a first material, wherein the base substrate includes a cavity formed in a portion of a surface of the base substrate;
applying, via an additive manufacturing process, a voxel layer to the cavity, the voxel layer forming at least a portion of at least one of personalization or serialization information within the cavity; and
causing the base substrate and the voxel layer to harden.

12. The method of claim 11, further comprising:
applying, via the additive manufacturing process, a first additive manufactured layer to at least a portion of the surface of the base substrate including the voxel layer.

13. The method of claim 12, wherein the first additive manufactured layer comprises at least one of personalization information or serialization information embedded therein.

14. The method of claim 11, wherein the additive manufacturing process comprises three-dimensional (3D) printing.

15. The method of claim 11, wherein the additive manufacturing process comprises material jetting.

16. The method of claim 11, wherein the base substrate comprises non-serialization and non-personalization information on the surface.

17. The method of claim 11, wherein the base substrate and the voxel layer harden to form a monoblock layer, and further comprising:
applying an additional layer to at least a portion of the monoblock layer, wherein the additional layer is a second additive manufactured layer, a varnish, a laminate, or a film.

18. A credential formed by a process comprising:
applying, via an additive manufacturing process, a voxel layer to a cavity formed in a portion of a surface of a base substrate formed from a first material, the voxel layer forming at least a portion of at least one of personalization information or serialization information within the cavity; and
causing the base substrate and the voxel layer to harden.

19. The credential of claim 18, wherein the base substrate comprises information on the surface that is non-serialization or non-personalization information on at least a portion of the surface.

20. The credential of claim 18, wherein the base substrate comprises at least one of some personalization or some serialization information included on at least a portion of the surface.

* * * * *